Dec. 31, 1963　　K. L. BERNINGER ETAL　　3,115,939
VARIABLE PITCH PROPELLER
Filed Jan. 10, 1961　　8 Sheets-Sheet 4
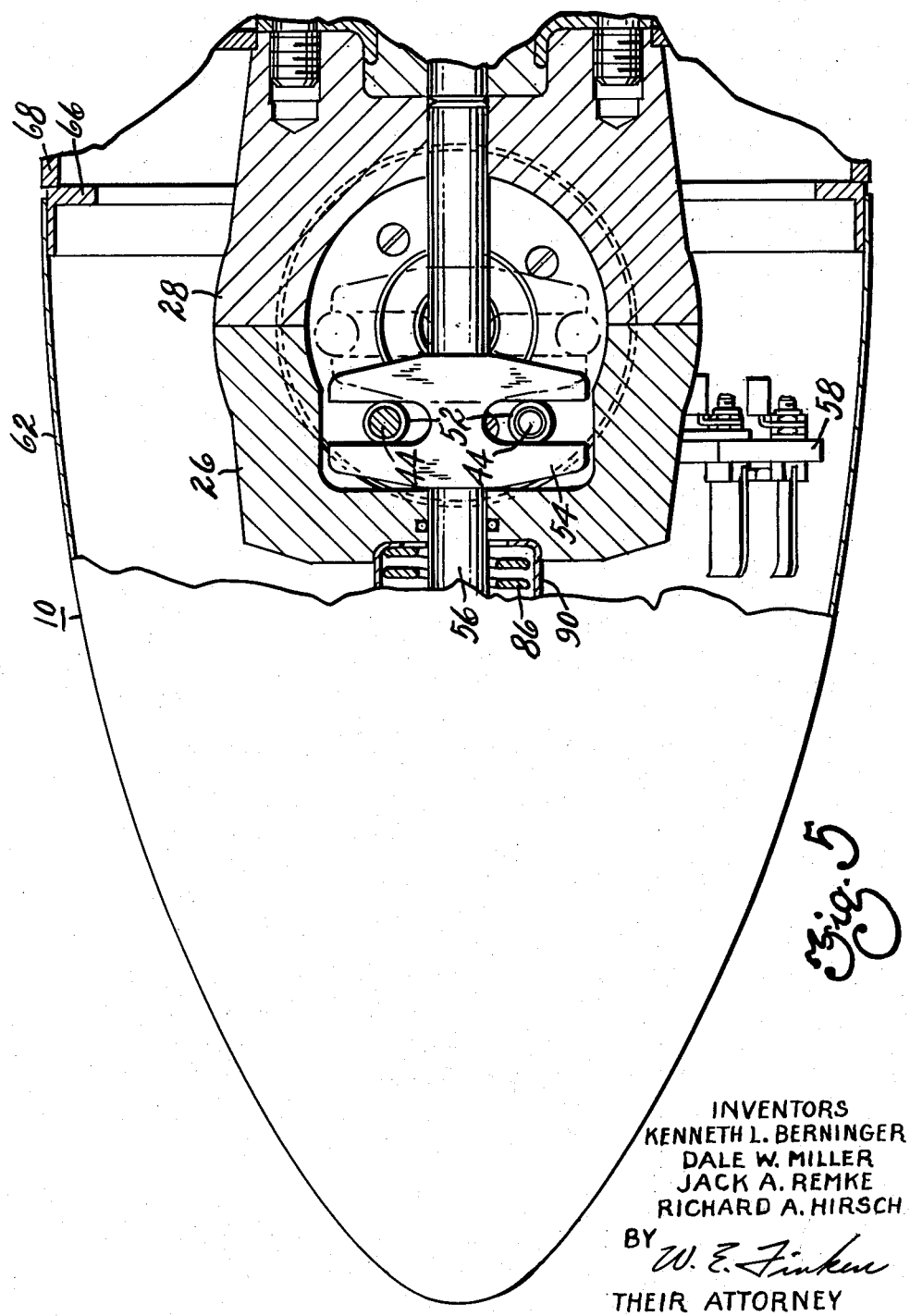
INVENTORS
KENNETH L. BERNINGER
DALE W. MILLER
JACK A. REMKE
RICHARD A. HIRSCH
BY *W. E. Finken*
THEIR ATTORNEY

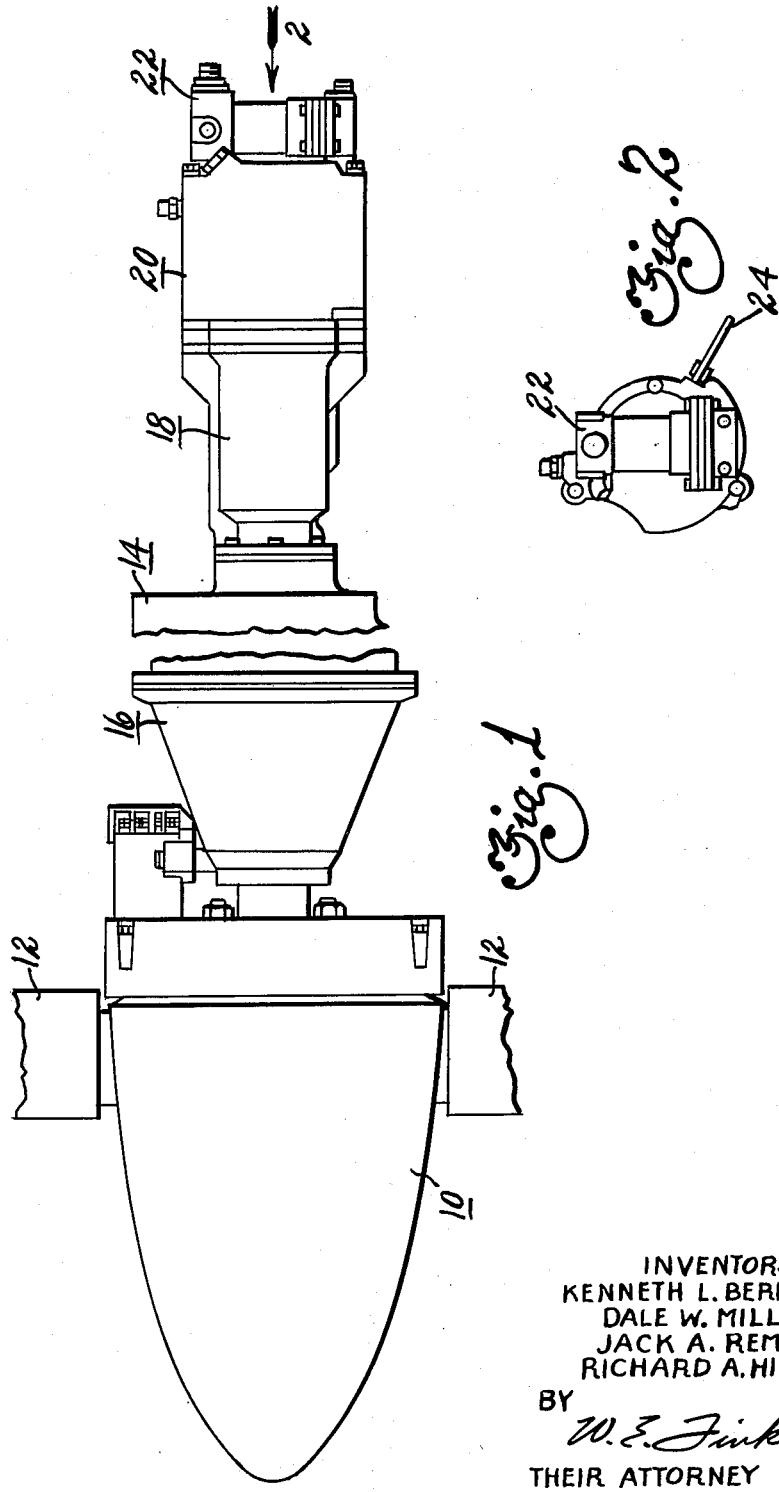

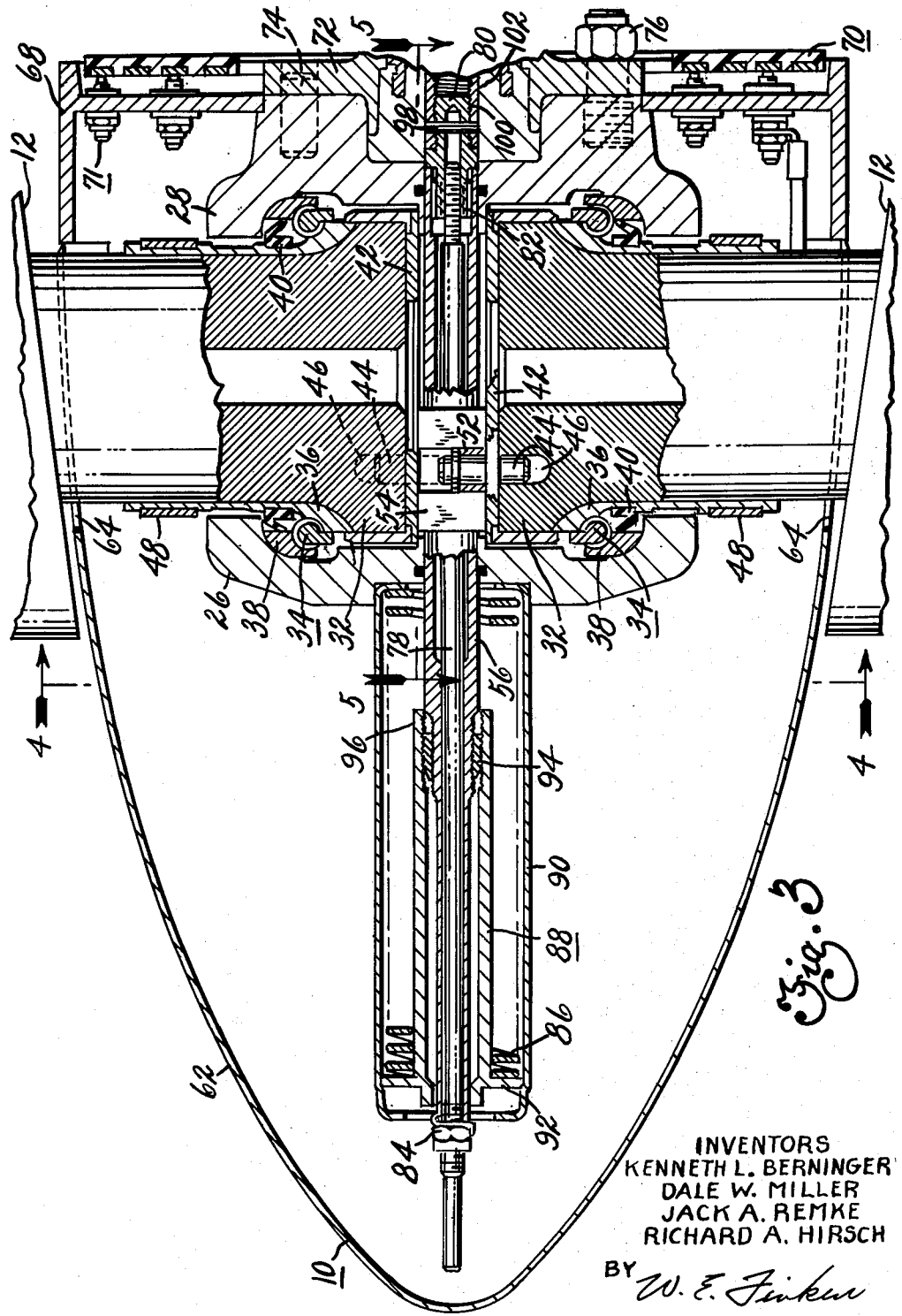

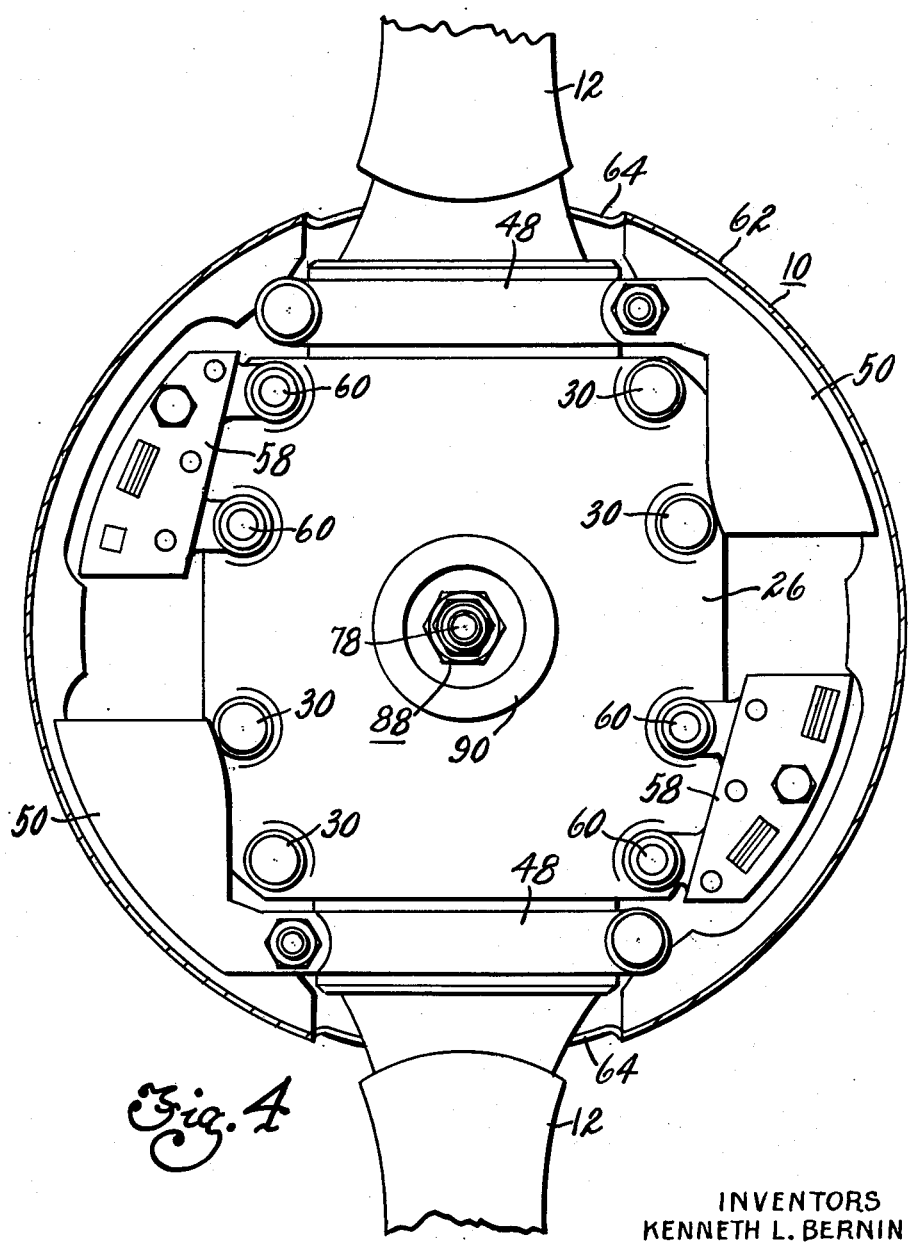

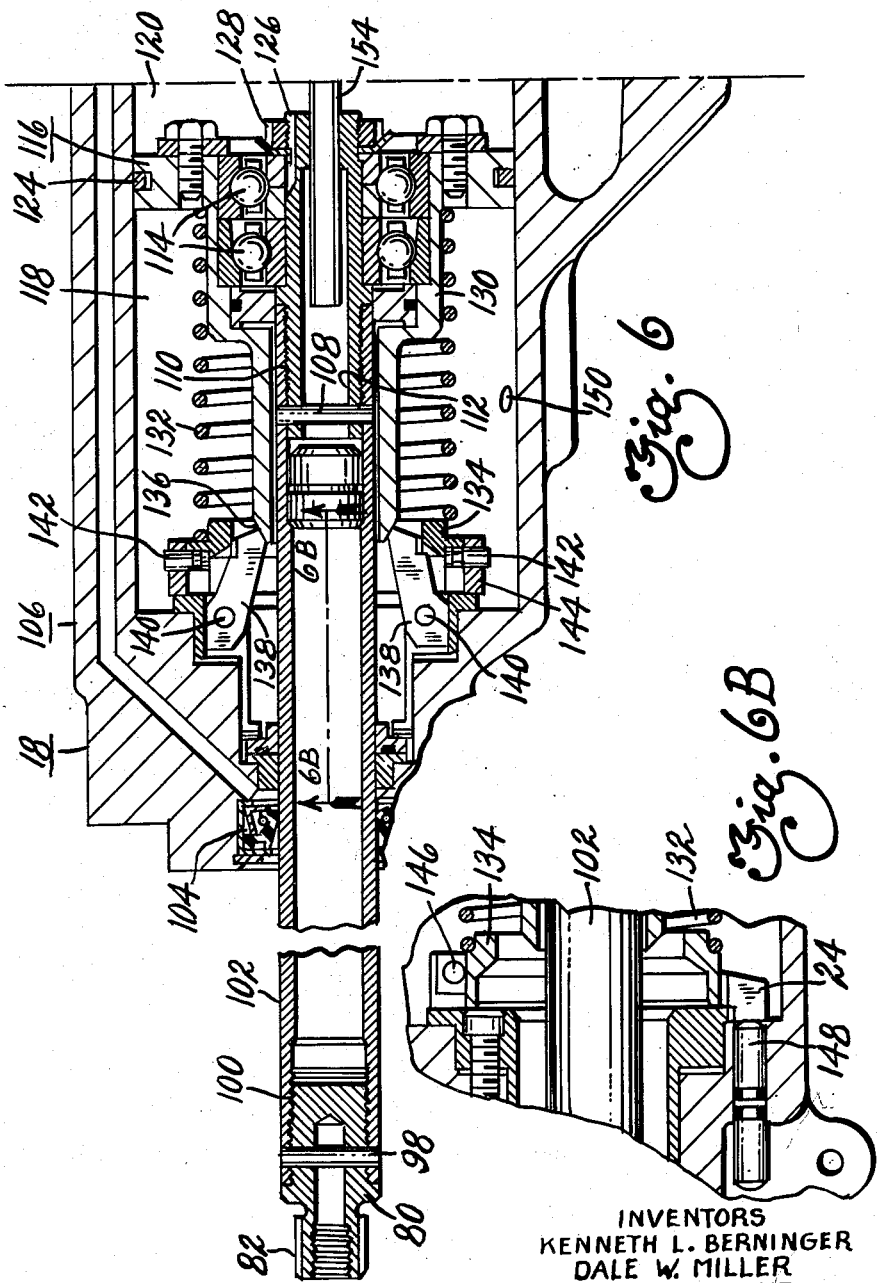

Dec. 31, 1963   K. L. BERNINGER ETAL   3,115,939
VARIABLE PITCH PROPELLER

Filed Jan. 10, 1961   8 Sheets-Sheet 6

INVENTORS
KENNETH L. BERNINGER
DALE W. MILLER
JACK A. REMKE
RICHARD A. HIRSCH
BY
W. E. Finken
THEIR ATTORNEY Dec. 31, 1963     K. L. BERNINGER ETAL     3,115,939
VARIABLE PITCH PROPELLER
Filed Jan. 10, 1961     8 Sheets-Sheet 7
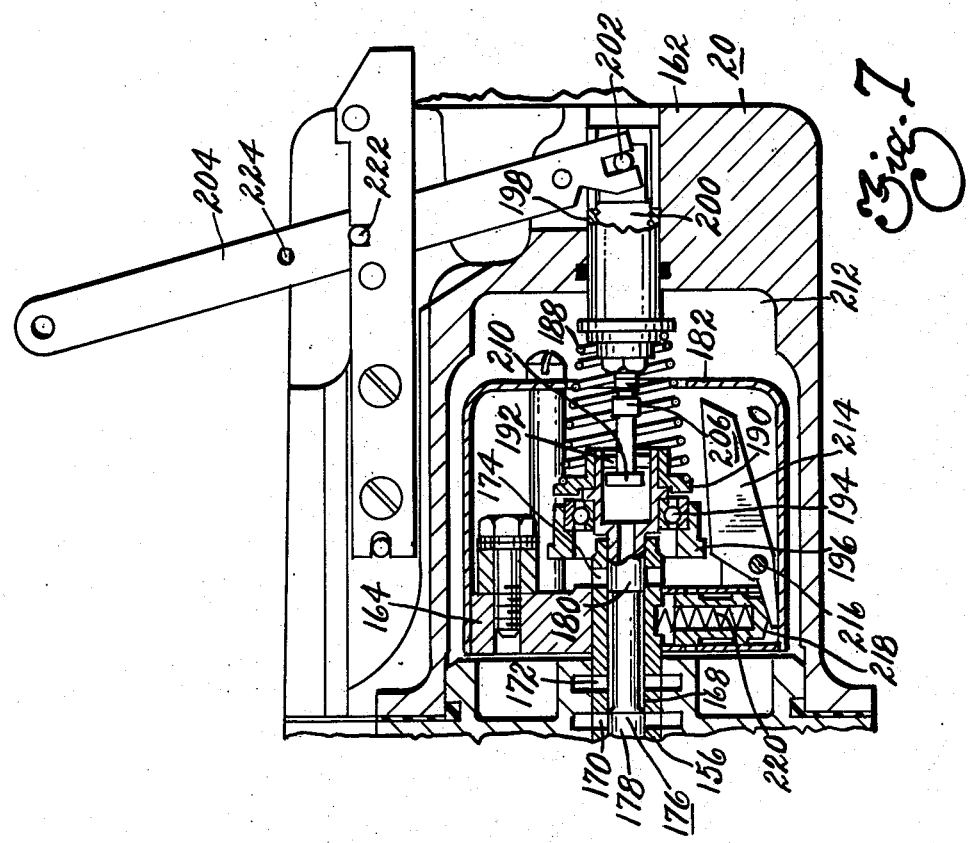
INVENTORS
KENNETH L. BERNINGER
DALE W. MILLER
JACK A. REMKE
RICHARD A. HIRSCH
BY
*W. E. Finken*
THEIR ATTORNEY INVENTORS
KENNETH L. BERNINGER
DALE W. MILLER
JACK A. REMKE
RICHARD A. HIRSCH
BY W. E. Finker
THEIR ATTORNEY United States Patent Office 3,115,939
Patented Dec. 31, 1963

3,115,939
VARIABLE PITCH PROPELLER
Kenneth L. Berninger, Dayton, Dale W. Miller, Brookville, Jack A. Remke, Vandalia, and Richard A. Hirsch, West Milton, Ohio, assignors to General Motors Corporation, Detroit, Mich., a corporation of Delaware
Filed Jan. 10, 1961, Ser. No. 81,851
10 Claims. (Cl. 170—160.21)

This invention pertains to aeronautical propellers, and particularly to a variable pitch aeronautical propeller of simple design adapted for relatively small aircraft.

Heretofore, the majority of propellers designed for relatively small aircraft have either been of the fixed pitch type or of the automatically variable pitch type wherein the range of pitch variation is relatively small, and consequently, these prior art propellers do not embody what are now considered the basic necessary safety features of a variable pitch propeller or the versatility of control which enables the aircraft to be operated at maximum efficiency under all conditions. The present invention relates to an improved variable pitch propeller designed particularly for relatively small aircraft which, nevertheless, embodies all of the requisite safety features and enables the aircraft to operate under conditions of substantially optimum efficiency.

Accordingly, among our objects are the provision of a variable pitch propeller including pitch changing mechanism designed to inherently increase propeller pitch; the further provision of a variable pitch constant speed propeller embodying manual means for adjusting the selected speed level; the further provision of a variable pitch propeller including auxiliary means for moving the propeller blades to a full feathered position and unfeather the same; and the still further provision of a variable pitch propeller including spring-hydraulic pitch changing mechanism and stop means for facilitating operation of the propeller as a fixed pitch propeller upon a hydraulic failure.

The aforementioned and other objects are accomplished in the present invention by embodying blade counterweights to offset the decreasing twisting moment forces acting on the propeller blades and producing a net moment in the increase pitch direction in combination with oppositely acting feathering spring and hydraulic servo means for controlling propeller pitch. Specifically, the propeller includes a hub with a pair of propeller blades journalled therein for rotation about their longitudinal axes to different pitch positions. Each propeller blade carries a counterweight designed to offset the decrease pitch twisting moment force and produce a net moment in the increasing pitch direction as alluded to hereinbefore. The blades are coupled to a yoke for coordinating and effecting concurrent pitch adjustment of the propeller blades as controlled by a feathering spring and oppositely acting hydraulic servo.

In order to control the pitch changing mechanism, the propeller embodies an adjustable speed governor of the spring-flyweight type located remotely on the hub and driven at propeller speed. The governor controls the pressurization of the decrease pitch side of the hydraulic servo so as to maintain propeller speed substantially constant at the selected speed level. The propeller also embodies an over-speed governor of the spring-flyweight type which is operable to control propeller speed in the event the constant speed governor malfunctions. The hydraulic servo embodies a mechanical stop for limiting pitch changing movement of the blades in the increase pitch direction at a blade angle slightly above the maximum cruise angle which will be encountered by the propeller. This stop is manually controlled and can be released to permit propeller feathering by the feathering spring and blade counterweights.

In addition, the propeller embodies a hydraulic feathering control comprising a reversible electric motor driven pump which is operable to complete the feathering movement of the propeller blades and also unfeather the propeller blades independently of propeller rotation.

Further objects and advantages of the present invention will be apparent from the following description, reference being had to the accompanying drawings, wherein a prefererd embodiment of the present invention is clearly shown, and wherein similar reference numerals depict similar parts throughout the several views.

In the drawings:

FIGURE 1 is a longitudinal view, in elevation, with certain parts broken away, of an aircraft power plant including the variable pitch propeller of this invention.

FIGURE 2 is an end view, in elevation, taken in the direction of arrow 2 of FIGURE 1.

FIGURE 3 is a sectional view, with certain parts broken away, of the propeller hub and spinner.

FIGURE 4 is a view, partly in section and partly in elevation, taken along line 4—4 of FIGURE 3.

FIGURE 5 is a fragmentary view, partly in section and partly in elevation, taken along line 5—5 of FIGURE 3 with the blade counterweights removed.

FIGURES 6 and 6A are longitudinal views, partly in section and partly in elevation, of the propeller control unit.

FIGURE 6B is a fragmentary view, partly in section and partly in elevation, taken along line 6B—6B of FIGURE 6.

FIGURE 7 is a fragmentary view, partly in section and partly in elevation, taken along line 7—7 of FIGURE 6A.

Figure 6A:
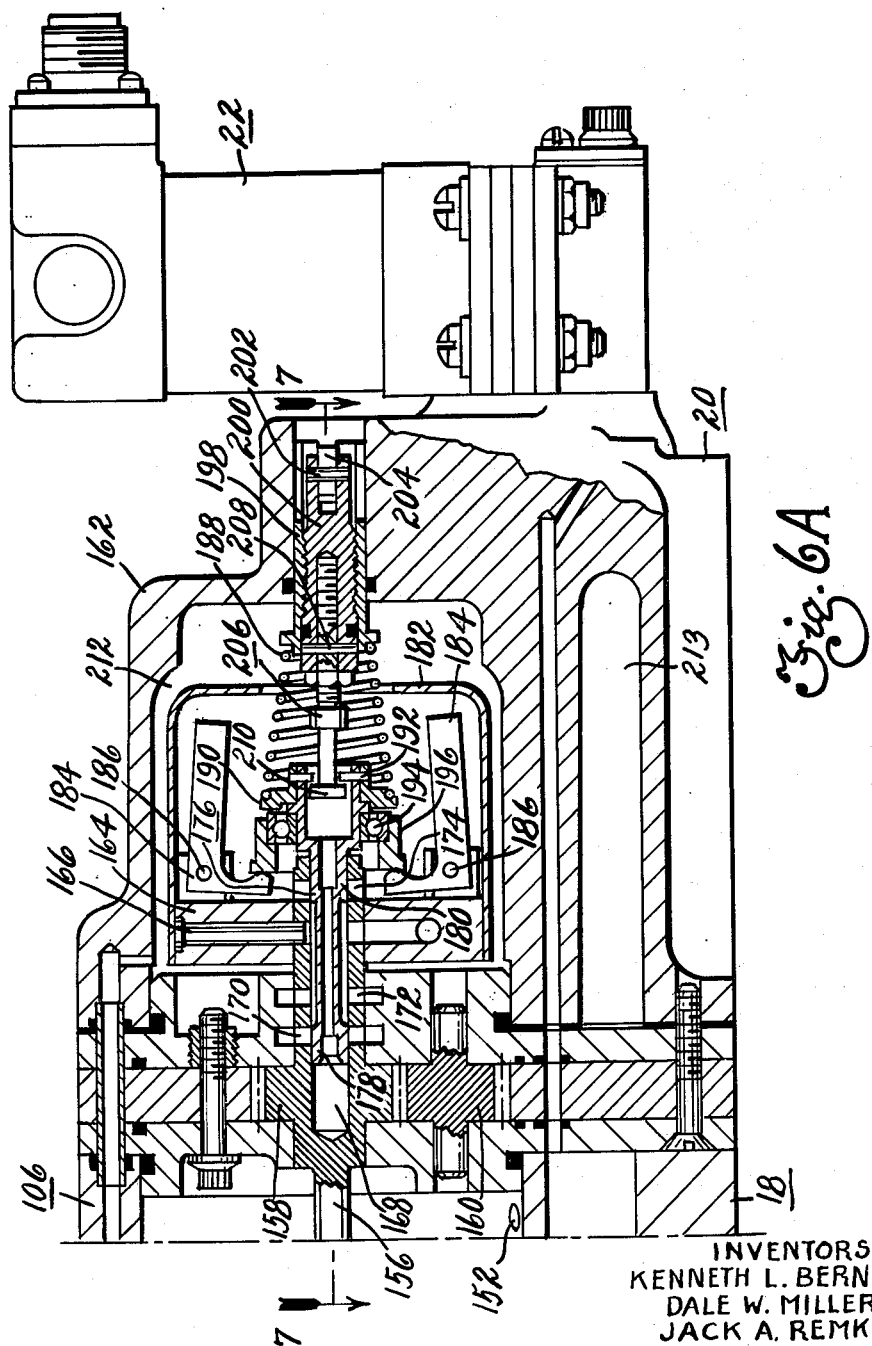

With particular reference to FIGURES 1 and 2, the aircraft power plant comprises a variable pitch propeller having a spinner 10 comprising a paraboloid revolution which encloses a hub having a pair of diametrically opposed blades 12 journalled therein for rotation about their longitudinal axes. The propeller is driven by a gas turbine engine 14 through a suitable gear reduction unit 16. The propeller control unit is mounted to the rear of the turbine 14 and hence does not rotate with the propeller, the propeller control unit comprising a torque unit assembly 18, a governor assembly 20, and a feathering pump assembly 22. A manually operable control linkage 24 is carried by the propeller control unit, as seen in FIGURE 2.

With particular reference to FIGURES 3 through 5, the propeller comprises a pair of forgings 26 and 28 which are interconnected by a plurality of axially extending bolts 30. The propeller blades 12, which may be composed of solid aluminum, are formed with integral shoulders 32 and are journalled for rotation in the propeller hub by ball bearing assemblies 34 comprising an inner race 36 which seats against the shoulder 32 and an outer race 38 which seats against a flanged portion of the hub. Chevron seals 40 are arranged outwardly of the ball bearing assemblies 34, and the root portion of each blade has a plate 42 bolted thereto, each plate carrying a radially extending pin 44 which extends into a bore 46 in its respective blade root. In addition, the shank portion of each propeller blade 12 has a clamp 48 attached thereto which retains the inner race 36 of the bearing and supports a blade counterweight 50, as seen in FIGURE 4.

Accordingly, the blade counterweights 50 are connected for rotation with the blades during pitch changing movement thereof, and are also rotatable with the propeller hub about the horizontal propeller axis. The blade counterweights 50 are utilized to offset the blade twisting moment forces which tend to move the propeller blades in the decrease pitch direction, and produce a small net moment in the increase pitch direction. The pins 44 carried by the plates 42 receive roller sleeves 52 which, as seen in FIGURE 5, engage slots in a pitch adjusting and pitch coordinating yoke 54 attached to a rotatable shaft 56 supported for axial movement relative to the hub forgings 26 and 28. As is readily apparent from an inspection of FIGURE 5, axial movement of the shaft 56 and the yoke 54 will result in concurrent pitch adjustment of the propeller blades 12 by imparting rotation to the propeller blades about their longitudinal axes. The front forging 26 also supports a pair of terminal block assemblies 58 which are used to supply power to electric deicing and anti-icing elements for the propeller. The terminal block assemblies 58 are connected to the hub forging 26 by bolts 60.

The spinner 10 comprises an integral nose section 62 having diametrically opposed cutouts 64 through which the blades 12 project, the nose section 62 being suitably attached to an annular bulkhead 66. The rear section 68 of the spinner 10 is carried by the rear hub forging 28 and embodies a disk-type slip ring assembly 70 engaged by a stationary brush block assembly 71 for transmitting electric power between the relatively rotating parts of the aircraft power plant.

The rear hub forging 28 is flange mounted to the propeller drive shaft 72, as seen in FIGURE 3. This flange mounting comprises a plurality of dowel pins 74 and a plurality of bolts 76.

The pitch adjusting yoke shaft 56 is tubular, as seen in FIGURE 3, and extends forwardly of the hub into the spinner nose section 62. A centrally arranged rod 78 extension is coaxially disposed within the tubular shaft 56, the rod 78 having threaded portions at opposite ends thereof. The inner threaded end of the rod 78 threadedly engages a coupling 80 which is connected by straight splines 82 to the tubular shaft 56. The outer threaded end of the rod 78 receives a nut 84 as seen in FIGURE 3. A coil-type feathering spring 86 is disposed within the nose section 62 of the spinner, the spring being supported on a tubular guide 88 and enclosed by a housing 90. The guide 88 has a flanged end 92 and threadedly engages the external threads of a nut 94. The nut 94 has internal threads engaging a threaded portion of the tubular shaft 56. The inner end 96 of the spring guide comprises a manually adjustable mechanical low pitch stop adapted to engage the end of the front hub forging 26. The mechanical low pitch stop position can be adjusted manually by rotating the spring guide 88 relative to the nut 94. This low pitch stop may be set at an angle of positive 16°. The spring 86 always acts to move the spring guide 88, and hence the tubular shaft 56, to the left, as viewed in FIGURE 3, which imparts movement to the propeller blades 12 towards the feathered position.

With particular reference to FIGURES 6 and 6A, the coupling 80 is connected by means of a cross pin 98 and threads 100 to a rotatable and axially movable pump drive shaft 102 which extends axially through the gear reduction unit 16 and turbine 14 to the control unit for the propeller. Specifically, the drive shaft 102 extends through a seal assembly 104 carried by the torque unit cylinder 106, wherein it is connected by means of a cross pin 108 and threads 110 to a coupling 112 journalled by ball bearing assemblies 114 for rotation relative to a reciprocable piston 116. The piston 116 divides the torque unit cylinder 106 into a decrease pitch chamber 118 and an increase pitch chamber 120. The piston 116 carries a suitable O-ring seal 124 and is suitably attached to the coupling 112 by means of a key 126 and a nut 128 such that reciprocation of the piston 116 imparts reciprocation to the coupling 112 and the pump shaft 102, which through the coupling 80, imparts reciprocation to the pitch adjusting shaft 56.

The torque unit piston 116 is formed with an integral forwardly extending sleeve 130 of stepped diameter. The larger diameter portion of the sleeve 130 constitutes a guide for one end of a coil spring 132, the other end of which engages an axially movable high pitch stop ring 134. The smaller diameter portion of the sleeve 130 is formed with a chamfered edge 136 that coacts with a pair of diametrically opposed pivotally mounted stop levers 138.

The stop levers 138 are supported by pins 140 and, in the position shown in FIGURE 6, engage the chamfered edge 136 of the sleeve 130 and the high pitch stop ring 134 so as to mechanically preclude further movement of the propeller blades in the pitch increasing direction. In the disclosed embodiment, the angle of the blades at the high pitch stop position, or the cruise stop, is a positive 37°, which angle is slightly higher than that normally encountered during constant speed propeller operation.

The spring 132 maintains the pitch stop ring 134 in its operative position. The ring 134 carries a pair of diametrically opposed pins 142 which are received in slots in a yoke 144 as shown particularly in FIGURE 6. The yoke 144 is supported for pivotal movement about a pin 146, the axis of which is located in a plane parallel to the horizontal propeller blade axis and in a plane normal to the axis of the pins 144. The yoke 144 can be manually pivoted through the propeller control linkage 24 which reciprocates a pin assembly 148 as seen particularly in FIGURE 6B. By effecting pivotal movement of the yoke 144 through the pin assembly 148, the pitch stop ring 134 is moved axially to the right, as viewed in FIGURE 6, thereby disengaging the stop levers 138 permitting outward pivotal movement thereof so as to permit movement of the propeller blades to the feathered position. Hydraulic fluid under pressure can be supplied and drained from the decrease pitch chamber 118 through a port 150 as seen in FIGURE 6, while hydraulic fluid under pressure can be supplied and drained from the increase pitch chamber 120 through a port 152 as seen in FIGURE 6A. The ports 150 and 152 connect with suitable passages in the walls of the torque unit cylinder 106.

The coupling 112 has a set of internal straight splines mating with external straight splines 154 on a rotatable pump drive shaft 156 thereby permitting relative axial movement therebetween. As seen in FIGURE 6A, the pump drive shaft 156 may be integral with a pump gear 158 meshing with a second gear 160 disposed within a pump housing. The shaft 156 extends into the governor assembly housing 162, the torque unit cylinder 106, the pump housing and the governor assembly 162 being suitably bolted together. An annulus 164, constituting a flyweight base is drivingly connected to the shaft 156 by a pin 166 and consequently rotates at propeller speed. The shaft 156 is formed with a central recess 168 and constitutes a valve guide having circumferentially spaced inlet ports 170, circumferentially spaced outlet ports 172, and circumferentially spaced drain ports 174 located in axially spaced relationship along its length. A hollow valve plunger 176 is supported for reciprocable movement wtihin the rotating valve guide constituted by a part of the shaft 156, and has axially spaced lands 178 and 180.

The annulus 164 has a cup-shaped sheet metal housing 182 attached thereto within which a pair of diametrically opposed centrifugally responsive flyweights 184 are disposed. The flyweights 184 are pivoted at 186 to lugs attached to the base 164 and hence rotate at propeller speed. Outward movement of the flyweights under the urge of centrifugal force is opposed by a governor spring 188, the inner end of which engages a spring seat 190 pinned at 192 to the valve plunger 176. The plunger 176 carries a ball bearing assembly 194 which supports a governor flyweight abutment 196 that is engaged by the inner ends of flyweights 184. The spring seat 196 imparts axial movement to the valve plunger 176 to the right, as seen in FIGURE 6A, through the ball bearing assembly 194 during outward radial movement of the flyweights 184 as opposed by the spring 188.

The outer end of the spring 188 engages a seat comprising a sleeve 198 which threadedly engages a rod 200 having a bifurcated end connected by means of a pin 202 to one end of a manual control lever 204. The sleeve 198 is supported for reciprocable movement relative to the governor assembly housing 162. The rod 200 has a threaded bore which receives an actuator 206. The actuator 206 is also connected to the rod 200 by a cross pin 208. The actuator 206 has a flanged end 210 disposed within the end of the valve plunger 176 and engageable with the pins 192 for mechanically effecting movement of the valve plunger 176 to the right, as viewed in FIGURE 6A. The speed setting of the governor can be varied by adjusting the stress of the governor spring 188 through the sleeve 198 as controlled by the lever 204. The governor housing 162 includes an arcuate chamber 212 constituting a reservoir to be described more particularly hereinafter.

It is pointed out that the chamber 212 within the governor housing constitutes a reservoir which is filled at all times with hydraulic fluid. The pump comprising gears 158 and 160 draws fluid from the reservoir 212 and delivers this fluid under pressure to the supply ports 170 of the governor valve assembly. The control ports 172 are connected by passage means, not shown, to the decrease pitch chamber 118 of the torque unit through port 150.

With reference to FIGURE 7, the governor base 164 also supports a third flyweight 214 constituting an overspeed governor. The flyweight 214 is pivotally supported by a pin 216 and the inner end thereof engages a relief valve plunger 218 mounted radially of the base 164 and biased outwardly by a spring 220. The spring 220, of course, opposes outward radial movement of the flyweight 214. Moreover, the spring 220 is calibrated to prevent appreciable radial outward movement of the flyweight 214 unless propeller speed exceeds the maximum speed setting of the constant speed governor. Thus, the maximum speed setting of the constant speed governor may be on the order of 2050 propeller r.p.m., whereas the overspeed governor will not actuate the relief valve 218 unless propeller speed exceeds approximately 2080 r.p.m. At the speed setting of the overspeed governor, the relief valve plunger 218 is moved radially inward so as to prevent further decrease pitch movement of the propeller blades for connecting the decrease pitch chamber of the torque unit to drain as will be pointed out more particularly hereinafter.

As seen in FIGURE 7, the lever 204 is pivotally supported by a pin 222, the outer end of the lever 204 being adapted for connection to a pilot's control lever, and the intermediate portion, namely the aperture 224, being connected to the propeller control linkage 24 for controlling the cruise high pitch stop.

Figure 8:
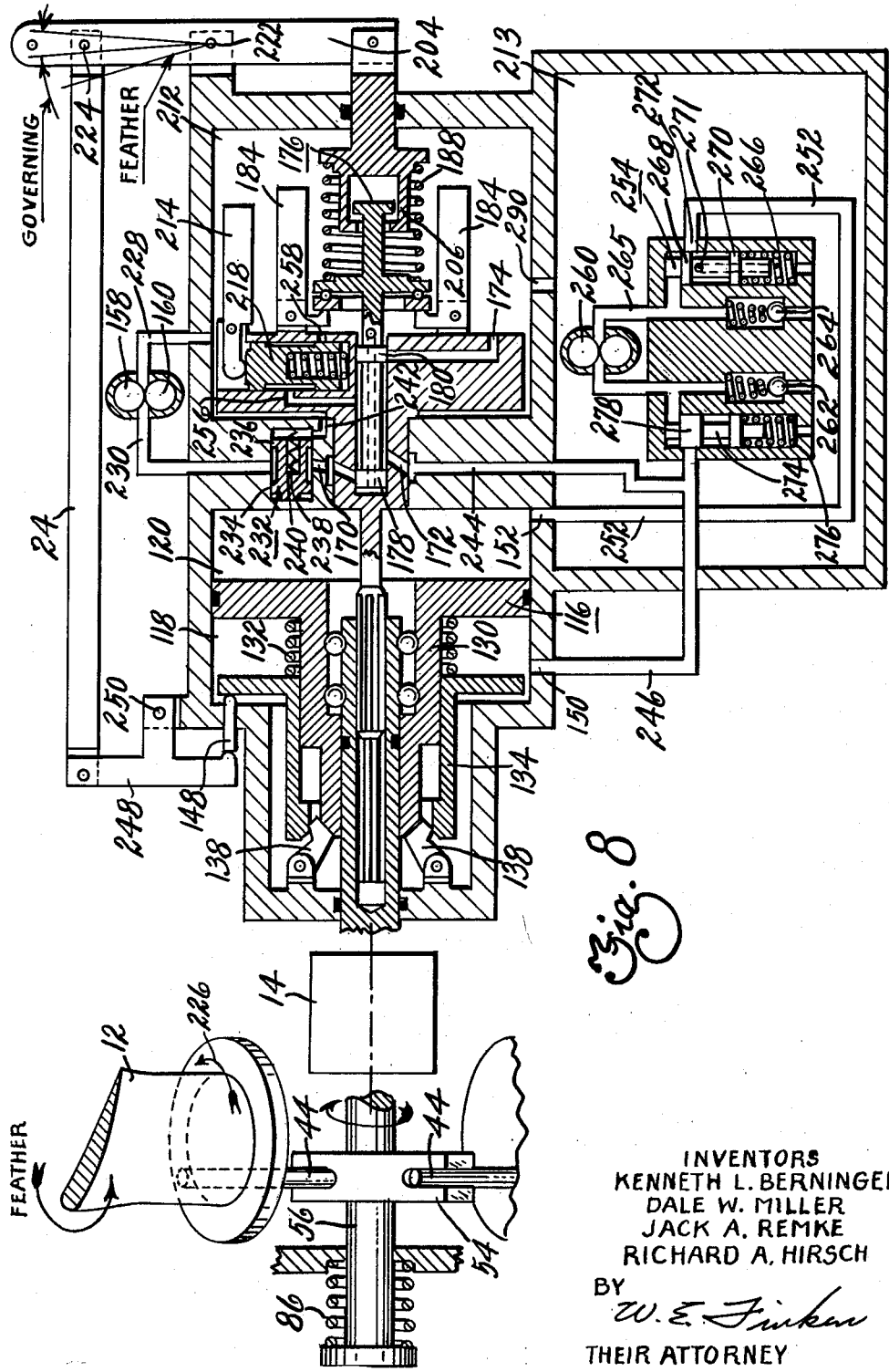
FIGURE 8 is a combined hydraulic and mechanical schematic of the propeller and the control system therefor.

With reference to FIGURE 8, the propeller and control system therefor is shown schematically in order to more particularly point out and simplify an explanation of the mode of operation. The propeller blades 12 are shown connected by pins 44 to the pitch adjusting yoke 54 which is biased to the right by feathering spring 86. The net increase pitch movement produced by the blade counterweights is indicated by arrow 226. The pump for supplying hydraulic fluid under pressure during normal operating conditions is schematically shown comprising gears 158 and 160 having an inlet 228 communicating with the governor reservoir 212 and an outlet 230 connecting with a pressure control valve 232. The pressure control valve 232 comprises a plunger having spaced lands 234 and 236 and biased to the left by a spring 238 as shown in FIGURE 8. The annular space between the lands 234 and 236 is connected by a bore 240 to the end surface of the plunger whereby pump pressure opposes the spring 238, and when the pump pressure exceeds the opposing force of the spring 238, the annular space between the lands is connected to a drain port 242. The annular space between the lands 234 and 236 of the pressure control valve is also connected to the inlet ports 170 of the governor valve. The control ports 172 of the governor valve are shown connected by a passage means 244 and 246 to the decrease pitch chamber 118.

The control lever 204 is shown pivoted at 222 and connected at 224 to the propeller control linkage 24. The other end of the linkage 24 is connected to a lever 248 having an intermediate pivot 250, the other end of the lever engaging the pin assembly 148 for releasing the high pitch cruise stop shown schematically as comprising the ring 134 and the stop levers 138.

The control lever 204 is shown in the governing position in FIGURE 8 and to increase the governor speed the lever 204 is moved in the clockwise direction, whereas to decrease the governor speed the lever 204 is moved in the counterclockwise direction. During constant speed operation at the manually selected speed level, the governor flyweights 184 control the position of the valve plunger 176 due to the opposing centrifugal and spring forces. If the propeller overspeeds, the flyweights 184 are moved radially outward to move the plunger 176 to the right thereby connecting the ports 172 to the drain ports 174 whereupon the feathering spring 86 and the counterweight forces will move the propeller blades in an increase pitch direction so as to reduce propeller speed. At the same time, pump pressure is connected to drain through the hollow plunger 176. Conversely, should the propeller underspeed, the flyweights 184 move inwardly permitting speeder spring 188 to move the valve plunger 176 to the left as viewed in FIGURE 8 thereby interconnecting the control ports 172 with the pressure port 170 whereby the torque unit piston 116 will move to the right so as to decrease propeller pitch. During control of the propeller by the governor 184, the increase pitch chamber 120 is connected to drain through passage 252 and valve 254 of the feathering assembly as will be described more particularly hereinafter.

In the event the propeller should overspeed, by reason of the plunger 176 becoming stuck in its valve guide in a decrease pitch position, the overspeed governor flyweight 214 will move outwardly and actuate the relief valve 218 by moving it downwardly, as seen in FIGURE 8, so as to interconnect ports 256 and 258, thereby connecting the annular groove between the lands 178 and 180 of the plunger 174 to drain. In this manner, the decrease pitch chamber 118 will be connected to drain through passages 246 and 244, ports 172 and ports 256 and 258. Accordingly, the feathering spring 86 and the blade counterweight forces will increase the pitch position of the propeller blades and the propeller will operate at the speed setting of the overspeed governor. This occurs since if propeller pitch is increased so that propeller speed falls below the speed setting of the overspeed governor, the relief valve 218 will be closed thereby enabling propeller pitch to be decreased by the flow of hydraulic fluid pressure when the pump 158, 160 is connected to the decrease pitch chamber 118 through the ports 170 and 172. On the other hand, if propeller speed exceeds the speed setting of the overspeed governor, the decrease pitch chamber is connected to drain, as alluded to hereinbefore thereby enabling the feathering spring and the blade counterweight forces to control propeller pitch.

In the event there is a complete hydraulic failure such as a loss of fluid, the feathering spring and the blade counterweight forces will increase propeller pitch until the cruise high pitch stop is engaged. That is, when the sleeve 130 engages the pitch stop levers 138, as seen in FIGURE 8, further movement of the piston 116 to the left, or in the increase pitch direction, is mechanically prevented. Accordingly, the propeller will then operate as a fixed pitch propeller with the blades remaining at the cruise pitch stop angle.

In the event it is desired to feather the propeller, this can be accomplished by moving the lever 204 to the feathered position. In this manner, the linkage 24 actuates lever 248 and the pins 148 to retract the stop sleeve, or annulus, 134 by moving it to the right against the spring 132 and enabling the feathering spring 86 and the counterweight forces to move the propeller blades to the feathered position.

The auxiliary feathering mechanism 22 is attached to the rear of the governor valve assembly and utilizes the reservoir 213 alluded to hereinbefore. The auxiliary feathering mechanism comprises a reversible electric motor driven gear pump 260 which is operable in either direction and thus can draw fluid from the reservoir 213 through either check valve 262 or check valve 264. To feather the propeller, the pump 260 is driven in a direction where fluid is drawn from the reservoir 213 through check valve 262 and delivered to passage 265. This fluid under pressure acts on the valve 254 comprising a plunger biased upwardly by a spring 266 and having spaced lands 268 and 270 and a drain port 271 connected with the annular groove between the lands 268 and 270. The land 268 is associated with a port 272 connected to the passage 252. Accordingly, when fluid under pressure is supplied to the passage 265, the valve plunger 254 will be moved downwardly thereby connecting the output of the pump 260 to the passage 252 and the increase pitch chamber 120 so as to move the piston 116 to the left and feather the propeller blades, it being understood that the stop ring 134 is in the retracted position.

Conversely, when the pump 260 is driven in the reverse direction, fluid is drawn through the check valve 264 and acts on plunger 274 biased upwardly by spring 276 and having a control land 278. This fluid pressure will move the plunger 274 downwardly whereupon pressure fluid will be supplied to the passage 246 and the decrease pitch chamber 118, while the increase pitch chamber 120 is connected to drain through passage 252 and ports 272 and 271. In this manner, the propeller blades can be unfeathered by the auxiliary feathering unit.

During hydraulic operation of the blades to the feathered position, the decrease pitch chamber 118 is connected to drain through passages 246 and 244, ports 172, the annular groove between lands 178 and 180 on the valve plunger 176 and drain ports 174, since when the lever 204 is moved to the feathered position the actuator 206 engages the plunger 176 and moves the same to the right, as viewed in FIGURE 8. The feathering pump reservoir 213 is interconnected with the governor reservoir 212 by a passage 290 as seen in FIGURE 8.

From the foregoing it is readily apparent that the present invention provides a constant speed propeller assembly of simple construction and design which, nevertheless, embodies all the requisite safety features. In other words, the propeller includes auxiliary means for effecting complete feathering and unfeathering operation thereof; the propeller will operate as a fixed pitch propeller at a safe positive blade angle upon a complete hydraulic failure; and the propeller will be operated at constant speed at a slightly higher governor r.p.m. upon failure of the primary governor assembly.

While the embodiment of the invention as herein disclosed constitutes a preferred form, it is to be understood that other forms might be adopted.

What is claimed is as follows:

1. A variable pitch propeller, including in combination, a hub, a plurality of blades journalled in said hub for rotation about their longitudinal axes to different pitch positions, resilient means acting constantly on said blades and tending to urge said blades in the increase pitch direction, fluid pressure actuated means operatively connected with said blades for moving said blades in the decrease pitch direction, pressure developing means energized incident to propeller rotation for developing a source of fluid under pressure, governor means driven by said propeller for controlling the application of fluid under pressure to said fluid pressure actuated means for maintaining propeller speed substantially constant, and releasable stop means operatively associated with said propeller blades for limiting the maximum positive pitch position of said blades during constant speed propeller operation whereupon upon failure of said fluid pressure actuated means said propeller will operate as a fixed pitch propeller at said predetermined positive blade angle.

2. A variable pitch propeller, including in combination, a hub, a plurality of blades journalled in said hub for rotation about their longitudinal axes from a low positive pitch position to a feathered pitch position, a feathering spring acting constantly on said blades and tending to urge said blades in an increase pitch direction, double acting fluid pressure actuated means operatively connected with said blades for moving said blades in either pitch direction, governor means for controlling the application of fluid under pressure to said fluid pressure actuated means for moving said blades in the decrease pitch direction to maintain propeller speed substantially constant during operation of said governor means, and feathering means capable of applying fluid under pressure to said fluid pressure actuated means to increase or decrease the pitch position of said propeller blades and render said governor means inoperative to control propeller pitch.

3. The propeller set forth in claim 2 including pump means energized incident to propeller rotation for developing a source of fluid under pressure during operation of said governor means.

4. The propeller set forth in claim 2 including pump means operable independent of propeller rotation for developing a source of fluid under pressure during operation of said feathering means.

5. The propeller set forth in claim 2 wherein said feathering means comprises a reversible electric motor driven pump, a reservoir with which said pump communicates, and fluid pressure operated valve means responsive to the direction of rotation of said pump and connected with said fluid pressure actuated means for supplying fluid under pressure to said fluid pressure actuated means to increase or decrease propeller pitch dependent upon the direction of rotation of said pump.

6. The propeller set forth in claim 5 wherein said valve means comprises a pair of spring biased check valves communicating with opposite sides of said pump, and a spring biased control valve connected in parallel with each spring biased check valve for connecting the output of said pump with opposite sides of the double acting fluid pressure actuated means.

7. The propeller set forth in claim 2 wherein said double acting fluid pressure actuated means comprises a cylinder having a reciprocable piston therein dividing said cylinder into an increase pitch chamber and a decrease pitch chamber, said governor means communicating only with said decrease pitch chamber, and wherein said feathering means communicates with both said increase pitch chamber and said decrease pitch chamber.

8. A variable pitch propeller including in combination, a hub, a plurality of blades journalled in said hub for rotation about their longitudinal axes from a low positive pitch position to a feathered position, a feathering spring acting constantly on said blade and tending to urge said blade in the increase pitch direction, fluid pressure actuated means operatively connected with said blades for moving said blades in the decrease pitch direction, pump means energized incident to propeller rotation for developing a source of fluid under pressure, a valve interconnected between said source of fluid pressure and said fluid pressure actuated means for controlling the flow of fluid under pressure therebetween, spring flyweight governor means driven by said propeller and operatively associated with said valve for maintaining propeller speed substantially constant, said governor means comprising an adjustable speeder spring, a pair of flyweights rotatable with said propeller and means responsive to the opposing forces of said flyweights and said spring for positioning said valve, an overspeed governor comprising a spring biased flyweight calibrated at a speed in excess of the maximum speed setting of said speeder spring, and an auxiliary valve controlled by said overspeed governor for controlling the application of fluid under pressure to said fluid pressure actuated means upon malfunction of said first recited valve.

9. A variable pitch propeller including in combination, a hub, a plurality of blades journalled in said hub for rotation about their longitudinal axes from a low positive pitch position to a feathered position, a feathering spring acting constantly on said blade and tending to urge said blade in the increase pitch direction, fluid pressure actuated means operatively connected with said blades for moving said blades in the decrease pitch direction, said fluid pressure means comprising a cylinder having a reciprocable piston therein, means operatively connecting said piston and said blades, releasable stop means engageable with said piston for limiting the maximum pitch position of said blades upon a failure of said fluid pressure actuating means, pump means energized incident to propeller rotation for developing a source of fluid under pressure, a valve interconnected between said source of pressure and said fluid pressure actuated means for controlling the flow of fluid under pressure therebetween, and spring-flyweight governor means driven by said propeller and operatively associated with said valve for maintaining a propeller speed substantially constant.

10. The propeller set forth in claim 9 wherein said stop means comprise a pair of stop levers adapted to wedgingly engage said piston and a stop ring, and manually operable means for moving said ring to permit movement of said blades to the feathered position under the urge of said resilient means.

References Cited in the file of this patent
UNITED STATES PATENTS

| | | |
|---|---|---|
| Re. 24,530 | Biermann | Sept. 2, 1958 |
| 2,307,849 | Mullen | Jan. 12, 1943 |
| 2,403,532 | Hoover | July 9, 1946 |
| 2,869,650 | Fairhurst et al. | Jan. 20, 1959 |
| 2,969,118 | Allen | Jan. 24, 1961 |

FOREIGN PATENTS

| | | |
|---|---|---|
| 703,319 | Germany | Mar. 6, 1941 |
| 480,747 | Great Britain | Aug. 9, 1937 |